(12) United States Patent
Desai

(10) Patent No.: US 11,627,148 B2
(45) Date of Patent: Apr. 11, 2023

(54) ADVANCED THREAT DETECTION THROUGH HISTORICAL LOG ANALYSIS

(71) Applicant: Zscaler, Inc., San Jose, CA (US)

(72) Inventor: Deepen Desai, San Ramon, CA (US)

(73) Assignee: Zscaler, Inc., San Jose, CA (US)

( * ) Notice: Subject to any disclaimer, the term of this patent is extended or adjusted under 35 U.S.C. 154(b) by 119 days.

(21) Appl. No.: 16/452,893

(22) Filed: Jun. 26, 2019

(65) Prior Publication Data

US 2019/0319972 A1    Oct. 17, 2019

Related U.S. Application Data

(63) Continuation-in-part of application No. 15/915,121, filed on Mar. 8, 2018, now Pat. No. 10,904,274.

(51) Int. Cl.
*H04L 9/40* (2022.01)
*G06F 16/955* (2019.01)

(52) U.S. Cl.
CPC ........ *H04L 63/1416* (2013.01); *G06F 16/955* (2019.01); *H04L 63/1425* (2013.01)

(58) Field of Classification Search
CPC .................................................. H04L 63/1416
See application file for complete search history.

(56) References Cited

U.S. PATENT DOCUMENTS

| | | | |
|---|---|---|---|
| 7,685,271 B1 * | 3/2010 | Schneider | H04L 43/50 717/124 |
| 9,094,288 B1 * | 7/2015 | Nucci | H04L 43/026 |
| 9,531,755 B2 * | 12/2016 | Singla | H04L 63/1425 |
| 10,142,362 B2 | 11/2018 | Weith et al. | |
| 10,581,874 B1 * | 3/2020 | Khalid | H04L 63/1425 |
| 10,951,633 B1 * | 3/2021 | Shulman-Peleg | G06F 21/566 |
| 11,159,486 B2 * | 10/2021 | Pangeni | H04L 67/10 |
| 2005/0229246 A1 * | 10/2005 | Rajagopal | H04L 63/0236 726/14 |
| 2013/0291101 A1 * | 10/2013 | Karasaridis | G06F 21/00 726/22 |
| 2014/0283068 A1 * | 9/2014 | Call | G06F 21/566 726/23 |
| 2015/0135263 A1 * | 5/2015 | Singla | H04L 63/20 726/1 |
| 2015/0281007 A1 * | 10/2015 | Mihelich | H04L 43/028 709/224 |
| 2016/0277431 A1 * | 9/2016 | Yu | H04L 63/1425 |

(Continued)

*Primary Examiner* — Harris C Wang
(74) *Attorney, Agent, or Firm* — Baratta Law PLLC; Lawrence A. Baratta, Jr.

(57) ABSTRACT

Systems and methods include obtaining data from a log system storing historical transactions monitored by a security system; creating one or more mock transactions based on the data; and analyzing the one or more mock transactions with a signature pattern matching engine having updates provided therein subsequent to a time of the historical transactions. The one or more mock transactions can have a header based on the data from corresponding historical transactions. The systems and methods can include performing a content scan in the one or more mock transactions based on the signature pattern matching engine having the updates, or determining malicious activity in the one or more mock transactions based on the signature pattern matching engine having the updates to determine missed matches in the corresponding historical transactions.

13 Claims, 11 Drawing Sheets

(56) References Cited

U.S. PATENT DOCUMENTS

| | | | |
|---|---|---|---|
| 2017/0054754 A1* | 2/2017 | Saher | G06F 21/53 |
| 2017/0293906 A1* | 10/2017 | Komarov | G06F 21/554 |
| 2017/0359220 A1 | 12/2017 | Weith et al. | |
| 2018/0139235 A1 | 5/2018 | Desai et al. | |
| 2018/0219879 A1* | 8/2018 | Pierce | H04L 63/1416 |
| 2019/0319972 A1* | 10/2019 | Desai | H04L 63/1425 |

* cited by examiner

FIG. 8

ADVANCED THREAT DETECTION THROUGH HISTORICAL LOG ANALYSIS

CROSS-REFERENCE TO RELATED APPLICATION(S)

The present disclosure is a continuation-in-part of U.S. patent application Ser. No. 15/915,121, filed Mar. 8, 2018, and entitled "Signature Pattern Matching testing framework," the contents of which are incorporated by reference herein.

FIELD OF THE DISCLOSURE

The present disclosure generally relates to computer and networking systems and methods. More particularly, the present disclosure relates to systems and methods for advanced threat detection through historical log analysis.

BACKGROUND OF THE DISCLOSURE

In computer security including cloud-based security systems, Signature Pattern Matching (SPM) is used to detect signatures of known exploits, malware, viruses, etc. Security researchers maintain a database of signatures which are used by security systems in operation to monitor and analyze data, for the presence of a signature in the database. Over time, new signatures are added to the database as new exploits, malware, viruses, etc. ("malicious traffic") are detected. It is important to determine if any newly added signatures in the database work, i.e., perform actual detection. The conventional testing approach utilizes a PERL function to simulate the operation of an SPM pattern matching library that operates on a server. However, this testing approach is only testing new signatures in a controlled, laboratory environment. That is, the simulated SPM pattern matching library does not reflect actual deployed conditions where the new signatures are compiled in the library and where the library is used to detect other signatures as well as the signatures under test, i.e., in a real, live deployment. While simulated testing is simplified, it does not actually test what is deployed.

Further, cloud-based (and other) security systems can maintain logs of user transactions. Such logs keep track of historical transactions. As mentioned above, a security system includes a signature database that may be continually updated over time. As such, there could be malicious traffic in the historical transactions that were missed with the signature database at the time, but would be detected with a later signature database with associated updates.

BRIEF SUMMARY OF THE DISCLOSURE

In an embodiment, a method and a non-transitory computer-readable storage medium having computer readable code stored thereon for programming a processor to perform the steps of obtaining data from a log system storing historical transactions monitored by a security system; creating one or more mock transactions based on the data; and analyzing the one or more mock transactions with a signature pattern matching engine having updates provided therein subsequent to a time of the historical transactions. In another embodiment, an apparatus includes a processor and memory storing instructions that, when executed, cause the processor to obtain data from a log system storing historical transactions monitored by a security system; create one or more mock transactions based on the data; and analyze the one or more mock transactions with a signature pattern matching engine having updates provided therein subsequent to a time of the historical transactions.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a mobile device which may be used in the cloud-based security system of FIG. 1 or the like;

FIG. 8 is a user interface screen of the signature system for an example SPM file;

DETAILED DESCRIPTION OF THE DISCLOSURE

Figure 1:
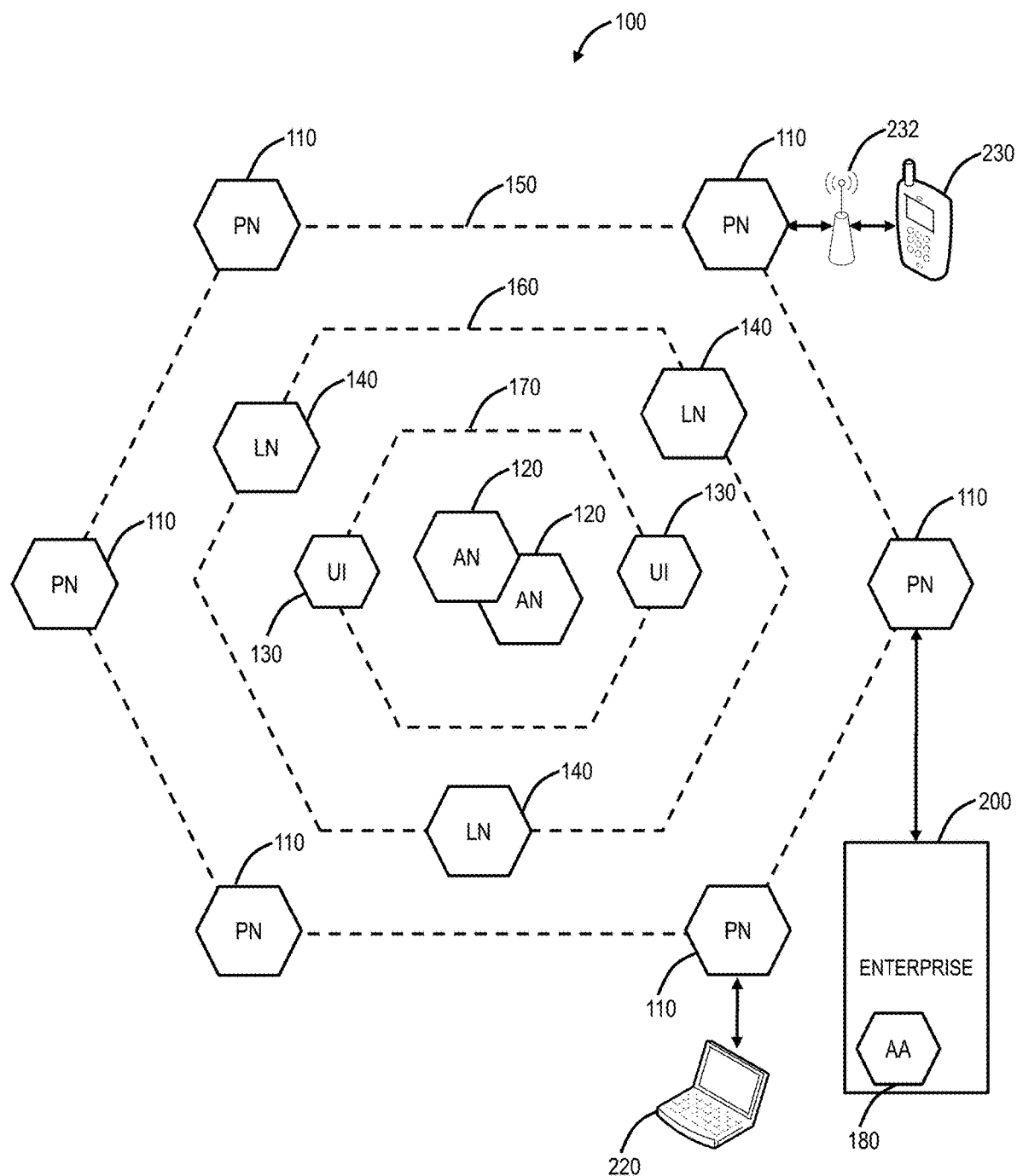
FIG. 1 is block diagram of a cloud-based security system.

The present disclosure relates to systems and methods for advanced threat detection through historical log analysis. A security system, such as a cloud-based security system, maintains a log of transactions. Further, the security system maintains a signature database to detect malicious traffic. The present disclosure includes historical log analysis where past transactions are "recreated" for testing with a later signature database. The objective here is to create mock transactions with the historical data and determine if any of the mock transactions are detected as malicious with the later signature database.

Also, the present disclosure relates to a Signature Pattern Matching (SPM) testing framework. As described herein, a cloud-based security system uses cloud resources for in-line monitoring of customer traffic for various security purposes including detection of malicious content via SPM. As new malicious content is detected (zero-hour, zero-day), new signatures are determined which need to be tested to determine their effectiveness if flagging the malicious content for remedial action (e.g., blocking in the cloud-based security system). The SPM testing framework dedicates some resources (e.g., one or more nodes in the cloud-based security system or portions thereof) for compiling new SPM libraries with new signatures and for running test cases thereon. Advantageously, this approach is not a simulation but reflects the actual behavior in a live, operating environment.

Systems and methods for testing Signature Pattern Matching (SPM) for a new signature associated with a cloud-based security system with a plurality of nodes and a testing node include operating the testing node with a same management software and SPM library as the plurality of nodes; obtaining a new signature derived to detect malicious content; compiling the new signature in the SPM library for the testing node; implementing one or more test cases related to the malicious content to analyze behavior of the testing node with the SPM library containing the new signature; and, responsive to success in the one or more test cases, providing the SPM library to the plurality of nodes for detection of the malicious content.

The conventional approach of using simulations such as through a PERL function to determine if a new signature is effective uses a controlled, laboratory environment. As described herein, this does not reflect actual deployed conditions where the new signatures are compiled in the library and where the library is used to detect other signatures as well as the signatures under test, i.e., in a real, live deployment. Thus, there is no ability to determine the actual responses, requests, and log data created by a node in a cloud-based security system with this new signature. The SPM testing framework described herein dedicates some resources in the cloud-based security system for live testing of new signatures under actual deployed conditions. In this manner, the operational effectiveness is not merely simulated but directly determined.

§ 1.0 Example High-Level System Architecture—Cloud-Based Security System

FIG. 1 is a block diagram of a cloud-based security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, Data Leakage Prevention (DLP), content filtering, etc., and other undesirable content sent from or requested by an external system. The processing nodes 110 can also log activity and enforce policies, including logging changes to the various components and settings in the system 100. Example external systems may include an enterprise or external system 200, a computer device 220, and a mobile device 230, or other network and computing systems communicatively coupled to the system 100. In an embodiment, each of the processing nodes 110 may include a decision system, e.g., data inspection engines that operate on a content item, e.g., a web page, a file, an email message, or some other data or data communication that is sent from or requested by one of the external systems. In an embodiment, all data destined for or received from the Internet is processed through one of the processing nodes 110. In another embodiment, specific data specified by each external system, e.g., only email, only executable files, etc., is process through one of the processing node 110.

Each of the processing nodes 110 may generate a decision vector $D=[d_1, d_2, \ldots, d_n]$ for a content item of one or more parts $C=[c_1, c_2, \ldots, c_m]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an embodiment, the actions taken by one of the processing nodes 110 may be determinative on the threat classification of the content item and on a security policy of the external system to which the content item is being sent from or from which the content item is being requested by. A content item is violating if, for any part $C=[c_1, c_2, \ldots, c_m]$ of the content item, at any of the processing nodes 110, any one of the data inspection engines generates an output that results in a classification of "violating."

Figure 3:
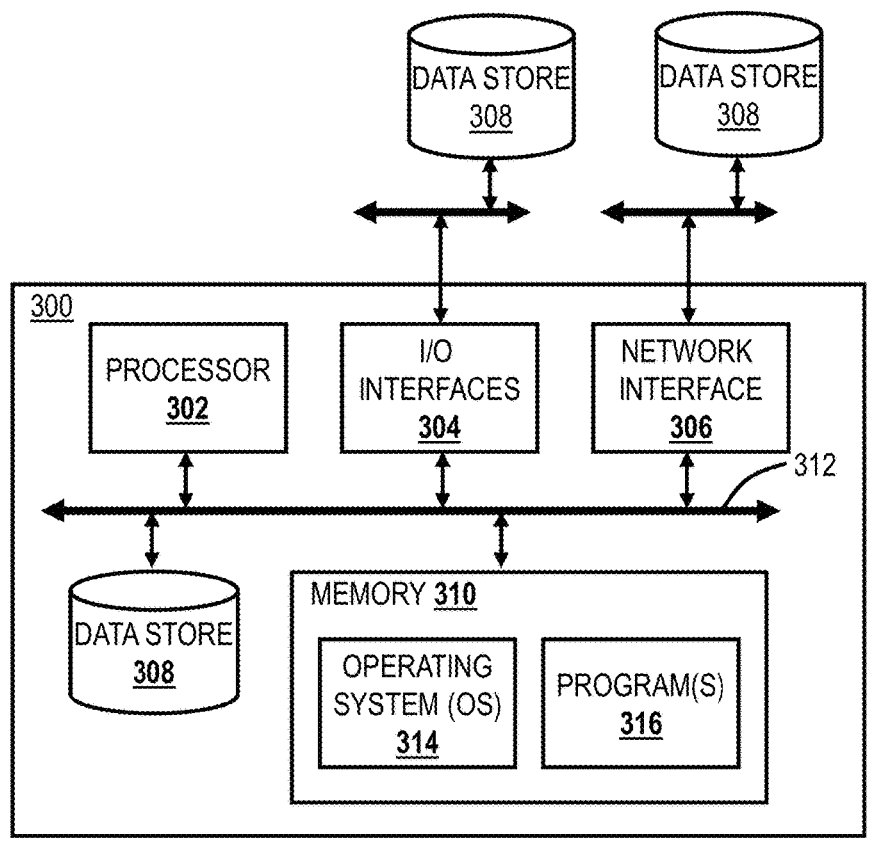
FIG. 3 is a block diagram of a server which may be used in the cloud-based security system of FIG. 1, in other systems, or standalone.

Each of the processing nodes 110 may be implemented by one or more of computer and communications devices, e.g., server computers, gateways, switches, etc., such as the server 300 described in FIG. 3. In an embodiment, the processing nodes 110 may serve as an access layer 150. The access layer 150 may, for example, provide external system access to the security system 100. In an embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicate to the nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the processing nodes 110. In an embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an embodiment, each of the authority nodes 120 may be implemented by one or more computer and communication devices, e.g., server computers, gateways, switches, etc., such as the server 300 described in FIG. 3. In some embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain websites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an embodiment, the processing node 110 may act as a forward proxy that receives user requests to external servers addressed directly to the processing node 110. In another embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise, the access agent 180 may be configured to perform MPLS labeling. In another transparent proxy mode embodiment, a protected system, such as the enterprise 200, may identify the processing node 110 as a next hop router for communication with the external servers.

Generally, the cloud-based security system 100 may generally refer to an example cloud-based security system. Other cloud-based security systems and generalized cloud-based systems are contemplated for the systems and methods described herein. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based security system 100 is illustrated herein as one embodiment of a cloud-based system, and those of ordinary skill in the art will recognize the tracking and auditing systems and methods contemplate operation on any cloud-based system.

§ 2.0 Example Detailed System Architecture and Operation

Figure 2:
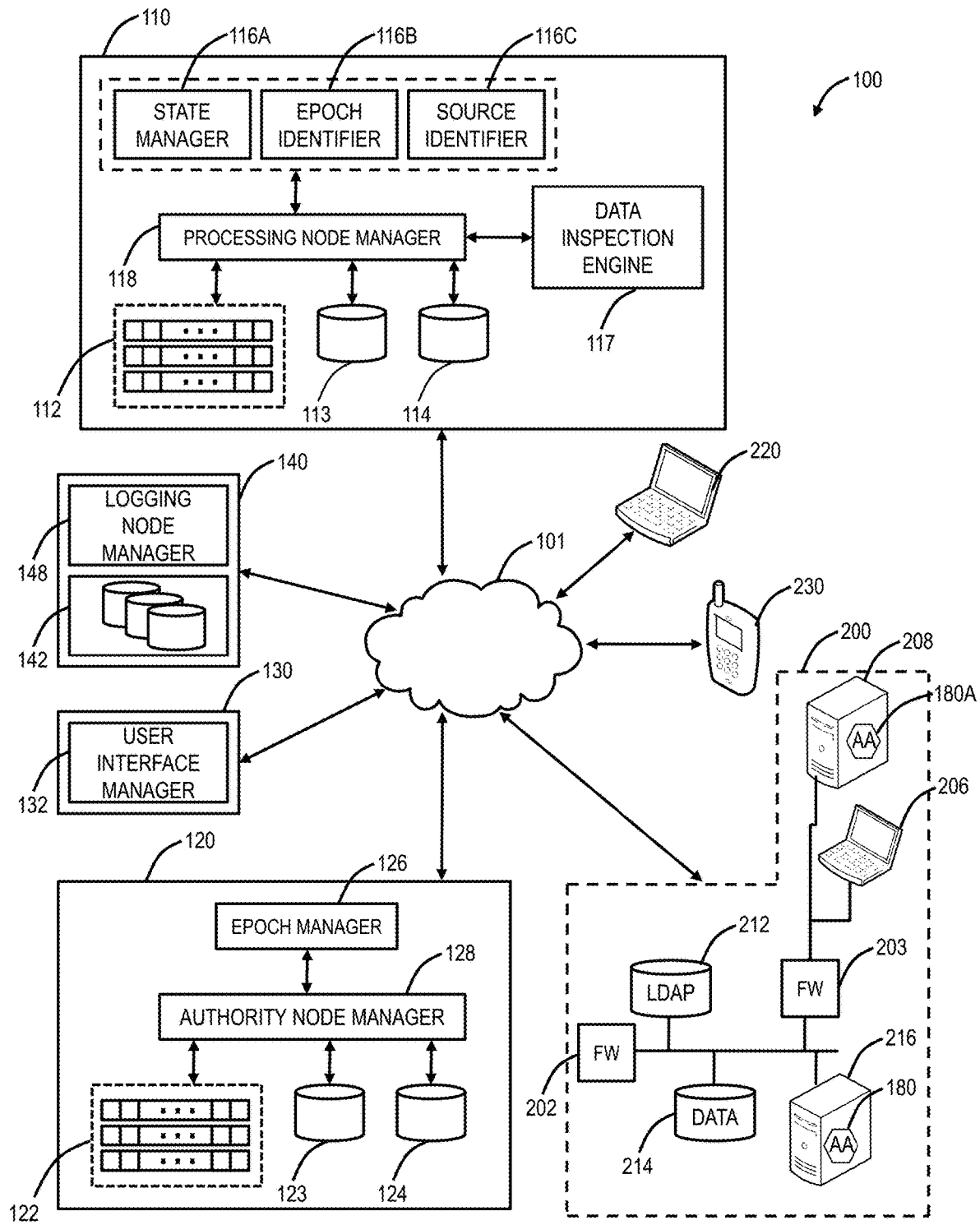
FIG. 2 is a block diagram of various components of the cloud-based security system of FIG. 1 in more detail.

FIG. 2 is a block diagram of various components of the cloud-based security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include user identifiers, login passwords, and a login history associated with each user identifier. The other data stores 214 may include sensitive information, such as bank records, medical records, trade secret information, or any other information warranting protection by one or more security measures.

In an embodiment, a client access agent 180a may be included on a client computer 206. The client access agent 180a may, for example, facilitate security processing by providing a hash index of files on the user computer 206 to a processing node 110 for malware, virus detection, etc. Other security operations may also be facilitated by the access agent 180a. In another embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the computers 206 of the enterprise 200, or to some other secure data provider server. The computer device 220 and the mobile device 230 can also store information warranting security measures, such as personal bank records, medical information, and login information, e.g., login information to a server 216 of the enterprise 200, or to some other secure data provider server.

§ 2.1 Example Processing Node Architecture

In an embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front-end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, the absence of information, while a one in that bit position can indicate the presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached using the detection processing filter 112. However, the worst case additional cost is only on the order of one, and thus its use for most failure queries saves on the order of m log m, where m is the number of information records present in the threat data 114.

The detection processing filter 112 thus improves the performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst-case null lookup operation into the threat data 114 is avoided, and a threat detection can be implemented immediately. The detection processing filter 112 thus complements the threat data 114 that capture positive information. In an embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position, and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 117 in any of the processing nodes 110. The authority node manager 128 may be used to manage the master detection processing filter 122, e.g., receive updates from processing nodes 110 when the processing node 110 has processed a content item and update the master detection processing filter 122. For example, the master detection processing filter 122 may be distributed to the processing nodes 110, which then store a local copy of the detection processing filter 112.

In an embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process and transmits the threat data update to an authority node 120.

The authority node manager 128, in response to receiving the threat data update, updates the master threat data 124 stored in the authority node data store according to the threat data update received from the processing node 110. In an embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 117 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process and transmits the threat data update to one of the authority nodes 120.

The authority node manager 128, in turn, may update the master threat data 124 and the master detection process filter 122 stored in the authority node data store according to the threat data update received from the processing node 110. In an embodiment, the authority node manager 128 may automatically transmit the updated threat data and detection processing filter to other processing nodes 110. Accordingly, threat data and the detection processing filter for new threats as the new threats are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are processes for which the threat data and/or detection process filters may be updated in the system 100 of FIGS. 1 and 2. Other update processes, however, are contemplated herein. The data inspection engines 117, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer-readable medium. Other processing architectures can also be used, e.g., a combination of specially designed hardware and software, for example.

§ 3.0 Example Server Architecture

FIG. 3 is a block diagram of a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touchpad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Example Mobile Device Architecture

Figure 4:
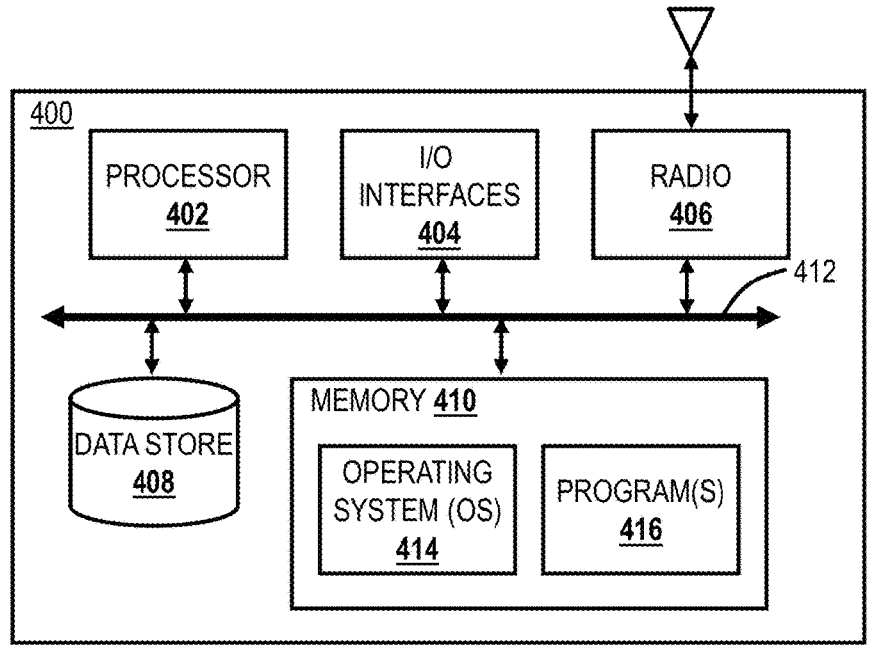

FIG. 4 is a block diagram of a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e., camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the mobile device 400. For example, programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 Example General Cloud System

Figure 5:
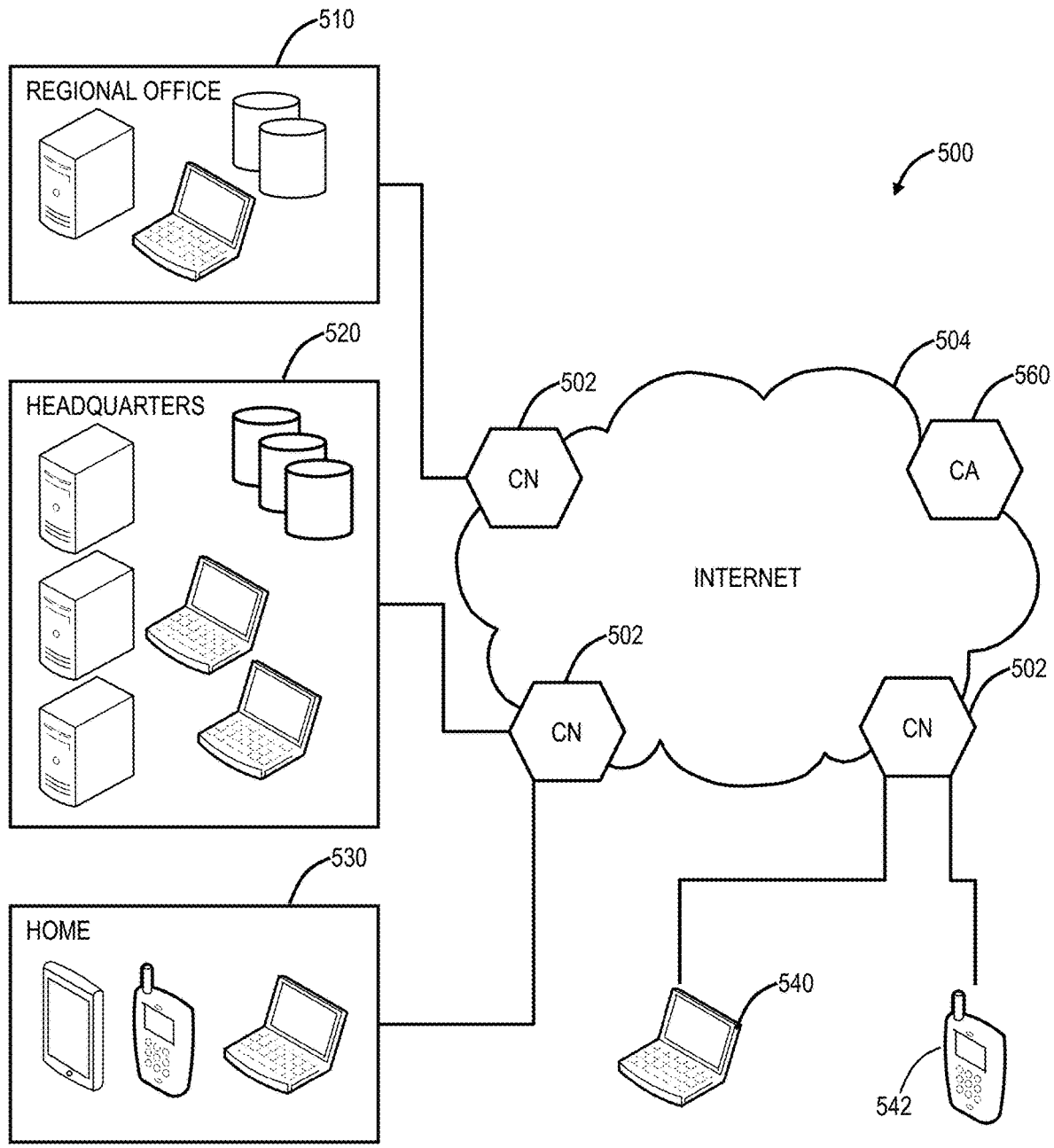
FIG. 5 is a network diagram of a cloud system for implementing the systems and methods described herein.

FIG. 5 is a network diagram of a cloud system 500 for implementing the systems and methods described herein. The cloud system 500 includes one or more cloud nodes (CN) 502 communicatively coupled to the Internet 504. The cloud nodes 502 may include the processing nodes 110, the server 300, or the like. That is, the cloud system 500 may include the cloud-based security system 100 or another implementation of a cloud-based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is; each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an embodiment, the cloud system 500 and the cloud-based security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a cloud-based security system, the tracking and auditing systems and methods enable accountability, intrusion detection, problem diagnosis, and data reconstruction, all in an optimized fashion considering the exponential growth in cloud-based systems.

§ 6.0 Processing Node SPM Functionality

As described herein, the processing node 110 is configured to provide inline signature-based anti-malware protection, detecting, and blocking all known viruses, spyware, and other kinds of malware. Each processing node 110 includes the threat data 114 which includes a real-time signature database of objects on the Internet known to be unsafe. As described herein, the processing node 110 runs the customer's traffic through multiple anti-virus engines, i.e., the data inspection engines 117. The data inspection engines 117 and the threat data 114 uses Signature Pattern Matching (SPM) to detect malware in the customer traffic. Also, as the cloud-based security system 100 can be global, multi-tenant, and cover a large number of users, new malware signatures can be detected, the signatures for SPM can be determined, and updates can be propagated to the processing nodes 110 such as via the authority node 110. The signatures are fingerprints of malicious files and used to match and detect malware in the cloud-based security system 100 to prevent users from accessing malicious files.

The systems and methods described herein provide an SPM testing framework after a new signature is determined to ensure the new signature can detect/block malicious files in a real, live deployment scenario. Once the new signature is determined effective, it can be updated/propagated to the processing nodes 110 in the cloud-based security system 100.

§ 7.0 SPM Testing Framework

Figure 6:
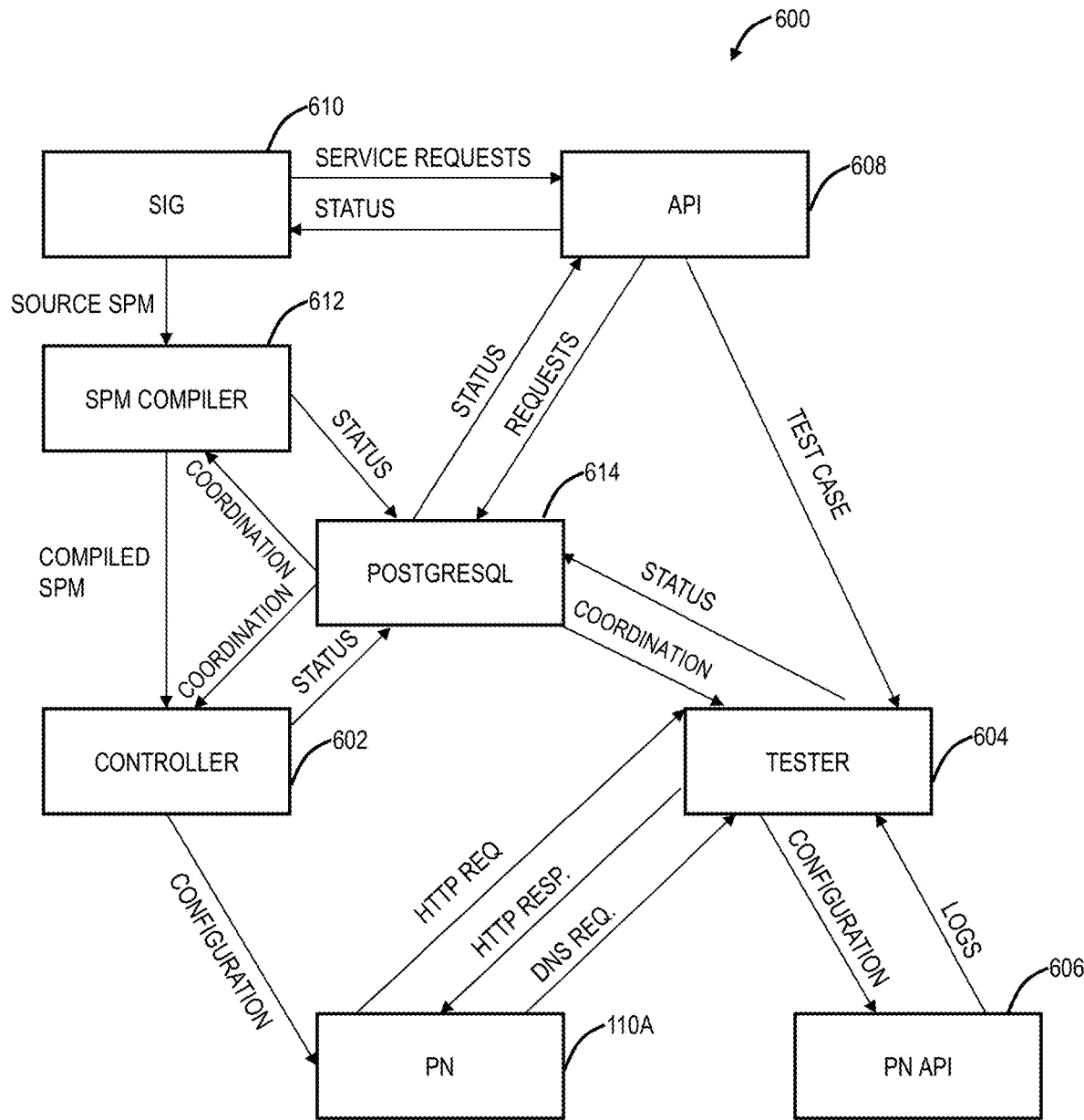
FIG. 6 is a block diagram of an SPM testing system.

FIG. 6 is a block diagram of an SPM testing system 600. Specifically, the SPM testing system 600 includes a processing node 110A which is a production-level node with a full set of software and functionality along with a configuration for testing new signatures. Again, as deployed currently, an SPM testing system compiles an SPM shared library from exactly the signature that is being tested and thus, it is not known what the system's behavior would be if the complete SPM file to be compiled. It is not an inherent limitation, but simply the way it is currently being used.

To provide a more accurate set of testing, the SPM testing system 600 includes a so-called test cloud which includes one or more processing nodes 110A which have the same management software as the processing nodes 110 operating in the cloud-based security system 100 and which run real Network Time Protocol (NTP), logging, etc. in a similar manner as the processing nodes 110. The processing node 110A can be viewed as a testing node. Here, the processing node 110A has the same functionality as a full operating processing node 110 in the cloud-based security system 100. The NTP functionality ensures the logs from the processing node 110A exactly match the time in the cloud-based security system 100. Thus, logs can be retrieved from the processing node 110A. If the time did not match between the processing node 110A and the cloud-based security system 100, it would not be possible to retrieve logs since the tests may only know time and client Internet Protocol (IP) address for certain—actual Uniform Resource Locator (URL) and logged URL often do not match.

The SPM testing system 600 includes the processing node 110A, a controller 602, a tester device 604, a processing node Application Programming Interface (API) 606, an API 608, a signature system 610, an SPM compiler 612, and PostgreSQL 614. Functionally, the SPM framework system 600 is configured to generate and compile new signatures for the processing node 110A to use in a live testing environment with the tester device 604.

In FIG. 6, the SPM testing system 600 is shown with the various components each having its function to test new signatures. FIG. 6 shows interaction and flow between the components, such as using PostgreSQL 614 for status, coordination, and request. When one part of the job is completed, processes that depend on that outcome are automatically notified, and so on, until the job is done.

An example flow in the SPM testing system 600 is as follows. First, an SPM file is generated for a signature of new malware, exploits, etc. This can be provided from the API 608 to the signature system 610. The signature system 610 can submit the SPM file for a compilation such as in the threat data 114. Here, the signature system 610 can provide the source SPM file to the SPM compiler 612 which compiles this new source SPM file into the master SPM file. The SPM compiler 612 can provide the compiled SPM file to the controller 602 which can provide this to the processing node 110A. Now, the processing node 110A has the new signature included with all other signatures and management software as the processing nodes 110. That is, the processing node 110A at this point can be similar with configuration, software, threat data 114, etc. as the processing nodes 110 with the difference being the addition of this SPM file for the new signature.

At this point, the processing node 110A is ready to test the operation of the full SPM file with the inclusion of the new SPM file compiled therewith. The tester device 604 is configured to send customer traffic through the processing node 110A with a file or other content which has been infected or has an exploit associated with the signature for the new SPM file. The tester device 604 and the processing node 100A can send an HTTP request, HTTP response, DNS request, etc. between one another. A description of tests is described herein.

The testing cloud can include one or more processing nodes 110A. The one or more processing nodes 110A can be part of the cloud-based security system 100. In an embodiment, the one or more processing nodes 110A can be the same as the processing nodes 110 and operate with live, customer traffic in the cloud-based security system 100, in addition to operating the testing cloud for verifying new SPM files. In another embodiment, the one or more processing nodes 110A can be the same as the processing nodes 110 and only operate with test, simulated, and/or historical traffic. Here, the test traffic and the simulated traffic can be generated to load the one or more processing nodes 110A as would be the case with actual operating conditions. The historical traffic can be previously monitored by one or more processing nodes 110.

In a further embodiment, the one or more processing nodes 110A can be the same as the processing nodes 110 and operate with simulated, intercepted, or copied customer traffic in the cloud-based security system 100. Here, the idea is the one or more processing nodes 110A do not service live customer traffic, but some of the live customer traffic can be copied or duplicated and sent to the one or more processing nodes 110A to simulate an actual operating environment. That is, some of the processing nodes 110 can relay the live customer traffic to the one or more processing nodes 110A, so these operate under real conditions to see if the new SPM file and associated signature works while other live customer traffic is being processed. Advantageously, this approach has no risk as no actual customers are being serviced, but the conditions are what would be found in an actual operating processing node 110. There can be a tunnel or the like between one or more of the processing nodes 110 and the one or more processing nodes 110A. Alternatively, the one or more processing nodes 110A can be collocated at the same data center, including in the same rack or virtual machine as the one or more processing nodes 110.

In any of these embodiments, the one or more processing nodes 110A are part of the cloud-based security system 100 with access to the authority nodes 120 for policy updates, etc. and to the logging nodes 140 for logging. Also, the one or more processing nodes 110A can be updated in the normal course of operation as the processing nodes 110 are, i.e., same versions. In this manner, the one or more processing nodes 110A are kept with the same operating conditions as the one or more processing nodes 110. Thus, the one or more processing nodes 110A are an ideal test bed for the new SPM file for determining operation in an actual deployed setting.

The tests can include log entries that are provided through the logging node 140 in the cloud-based security system 100. Further, the SPM testing system 600 can also track and log the testing status through the process as well as coordinate the components and storage of historical data, via PostgreSQL.

In an embodiment, the compilation of an SPM file requires the presence of at least three C object files that are compiled from C language source files, which are in turn generated from so-called "SPM" files by a program that is included in the source code of the cloud-based security system 10. The following table shows the relationship of the SPM files with their C files, and what each does.

| | | |
|---|---|---|
| phrases_req_body.spm | spmreq.c | Signatures Matching Request Body Strings |
| phrases_req_uri.spm | spmrequri.c | Signatures Matching Request URI Strings |
| phrases_res_body.spm | spmres.c | Signatures Matching Response Body Strings |

Rather than using a convoluted combination of Secure Shell (SSH) and subversion commits, the content of the three SPM files is serialized into a JavaScript Object Notation (JSON) format that is uploaded to the API 608 of the SPM testing system 600. Once uploaded, the SPM complier 612 grabs the file, transforms the three sections into the C files above, and executes a parallel compilation that can take approximately two seconds for a single SPM file. For a full SPM, it takes about 50% the time that the signature system 610 does, because of the parallel compilation. Nothing needs to be committed to the subversion.

The JSON format is a dictionary of three strings, each of which is the Base64 encoding of one of the three SPM files above. The following example is truncated for clarity:

```
{
  "phrases_res_body":
"KIwojIFJFRklELENB\nVEVHT1JZLERFUEVOREFOQ1ksRkx...",
  "phrases_req_body": "",
  "phrases_req_uri":
     "
     ",
}
```

§ 7.2 Test Case Submission

Figure 7:
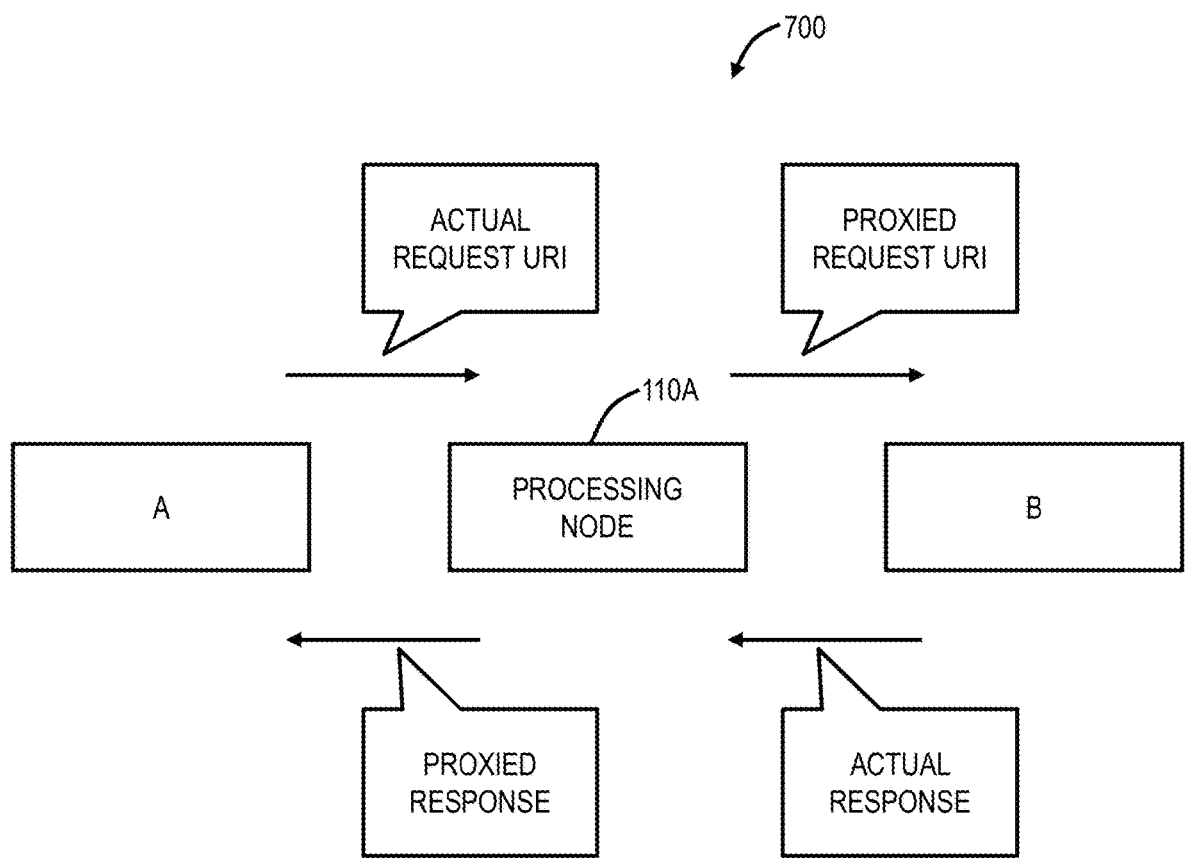
FIG. 7 is a network diagram of a proxy server for describing a test case in the SPM testing system.

FIG. 7 is a network diagram of a system 700 for describing a test case in the SPM testing system 600. Specifically, the processing node 110A (and the processing nodes 110) act as a proxy between a client A and a server B. For the test case, the SPM testing system 600 must define the actual request Uniform Resource Identifier (URI) and the actual response whereas the proxied request URI and the proxied response are unknown until the test case is run. When executing a test case, the following questions are posed to the processing node 110A:

Given an actual request URI, what is the proxied request URI, and what logs are made in response and given an actual response, what is the proxied response, and what logs are made in response.

The test case can be an HTTP transaction, a file download, an email with an attachment, etc. That is, the test case can be any transaction between the client A and the server B where it is expected the processing node 110A detects the new signature.

For example, an HTTP transaction is an example of a URI signature. Since it is a URI signature, the processing node 110A would be malfunctioning if it were to forward the request to the server A and therefore the request section will generally be the only part that will be present on the wire during a test where the processing node 110A performs correctly (it will stop the transaction before the stage where an outbound connection from the processing node 110A takes place.) Nevertheless, in all cases, the server portion of the test setup must be ready to respond with something, in case the signature does not pass or the processing node 110A functions in an unexpected manner.

An example HTTP transaction test case is as follows:

```
POST http://taco.com/rss/feed/stream HTTP/1.1 Connection: close
Content-Length: 16
User-Agent: Mozilla/5.0 (X11; Linux x86_64; rv:38.0) Gecko/20100101
Firefox/38.0 Iceweasel/38.3.0
Are tacos good? HTTP/1.1 403 Forbidden Content-Type: text/html Server:
Zscaler/5.1 Cache-Control: no-cache Content-length: 5624
<!--# Id: security.html 107842 2015-11-12 22:36:44Z szhang --> [SNIP]
<!-- 0 0 32 0 1455046518 32 http://taco.com/rss/feed/stream -->
```

The test cases are submitted as JSON documents such as formatted as follows:

```
[{
  "request": {
    "body":          "QXJlIHRhY29zIGdvb2Q/",
    "url": "http://taco.com/rss/feed/stream", "http_version": "1.1",
    "headers": {
       "Connection": "close",
       "User-Agent": "Mozilla/5.0 (X11; Linux x86_64; rv:38.0)"
    },
    "method": "POST", "header_order": null
  },
  "response": {
    "tcp_port": 80,
    "response_code": 200,
    "response_message": "OK",
    "data": "VGFjb3MgYXJlIGdvb2Qu",
    "headers": {
       "Date": "Thu, 17 Dec 2015 22:33:30 GMT",
       "Last-modified": "Thu, 17 Dec 2015 22:33:30 GMT",
       "Connection": "close",
       "Content-type": "text/html",
       "Server": "xs-httpd/3.7 beta/0.35"
    },
    "http_version": "1.1",
    "close_after_send": true,
    "header_order": null
  }
}]
```

A test case in technical terms is an array of one JSON object with fields "request" and "response." Each of the two fields has a value of another JSON object that contains only mandatory fields. The fields and their meaning are described in the sequel.

§ 7.3 User Interface

Figure 8:
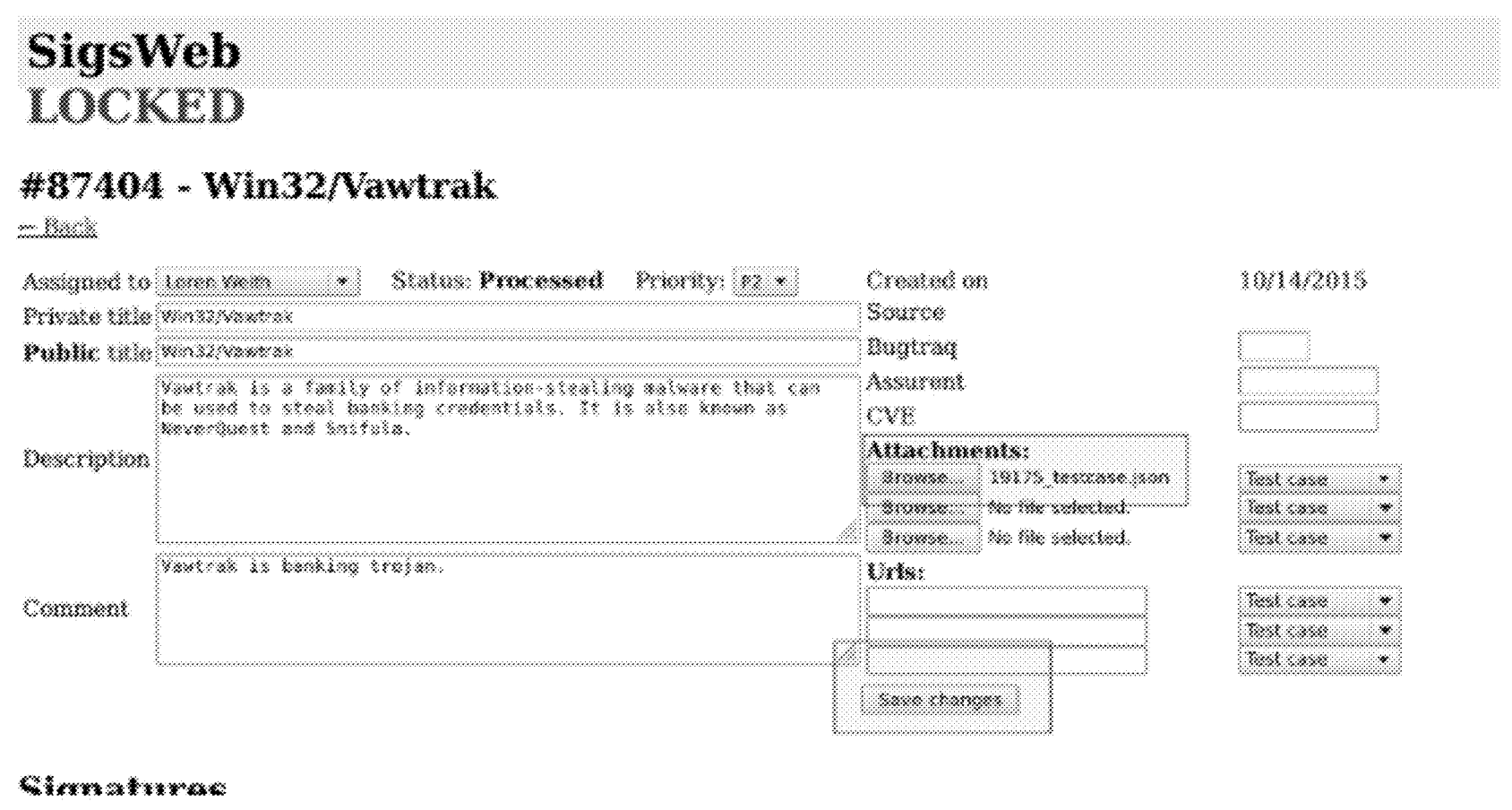
Figure 9:
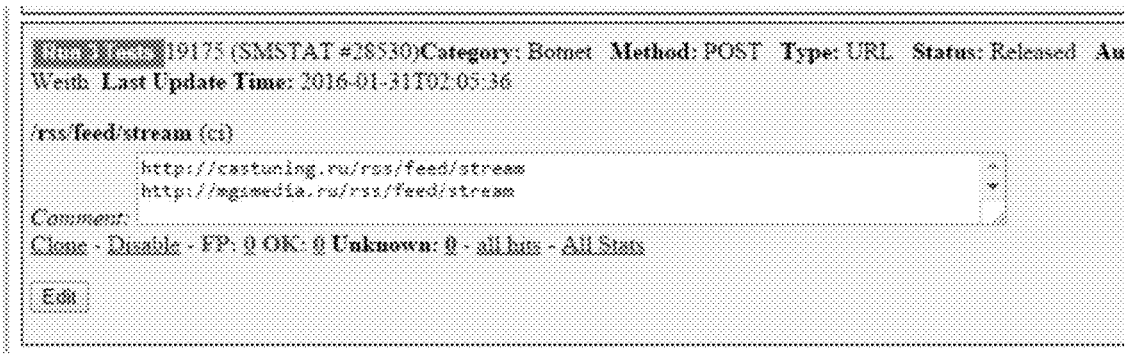
FIGS. 9 and 10 are screenshots of the tests and results from FIG. 8.
Figure 10:
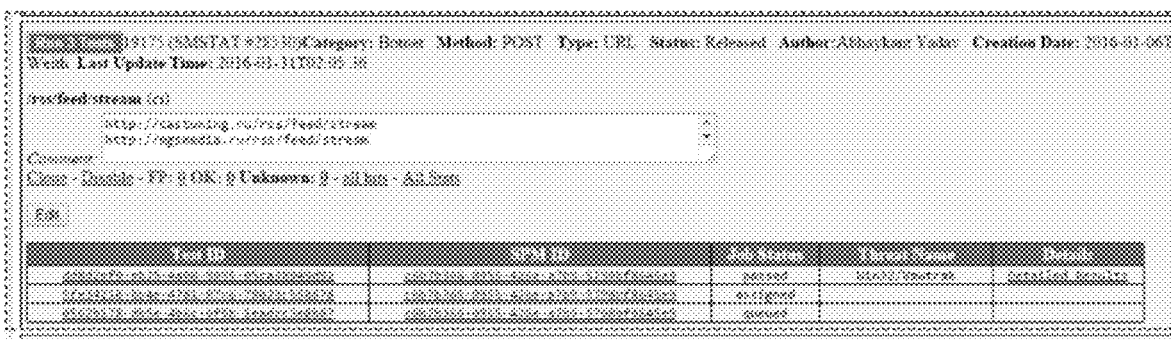

FIG. 8 is a user interface screen of the signature system 610 for an example SPM file. Here, the signature detects Win32/Vawtrak which is information-stealing malware. The SPM file can include various tracking data, priority, status, etc. along with test cases. Once the SPM file has been upgraded, the attachments section in FIG. 8 shows the file as present and the signature associated with the test case's filename. After save changes is clicked, the signature and test case can be submitted to the SPM testing system 600, at which point the signature is compiled and installed on the processing node 110A and whatever traffic is prescribed in the test case is sent through the processing node 110A, and its responses and log entries recorded and reported back in a table inside the section of the tickets window used to view/edit signatures. FIGS. 9 and 10 are screenshots of the tests and results from FIG. 8.

When the test has completed, a Job Status of "passed" is returned if the processing node 110A blocks the request and a ThreatName is associated with the test run (the threat name comes from the logging output). For detailed information about the test run, there is a link to a JSON file containing those details under the "Details" column. For signatures marked WRI, the status will be "failed," and the threat name will match the name of the ticket associated with the signature being tested.

§ 7.4 Method

Figure 11:
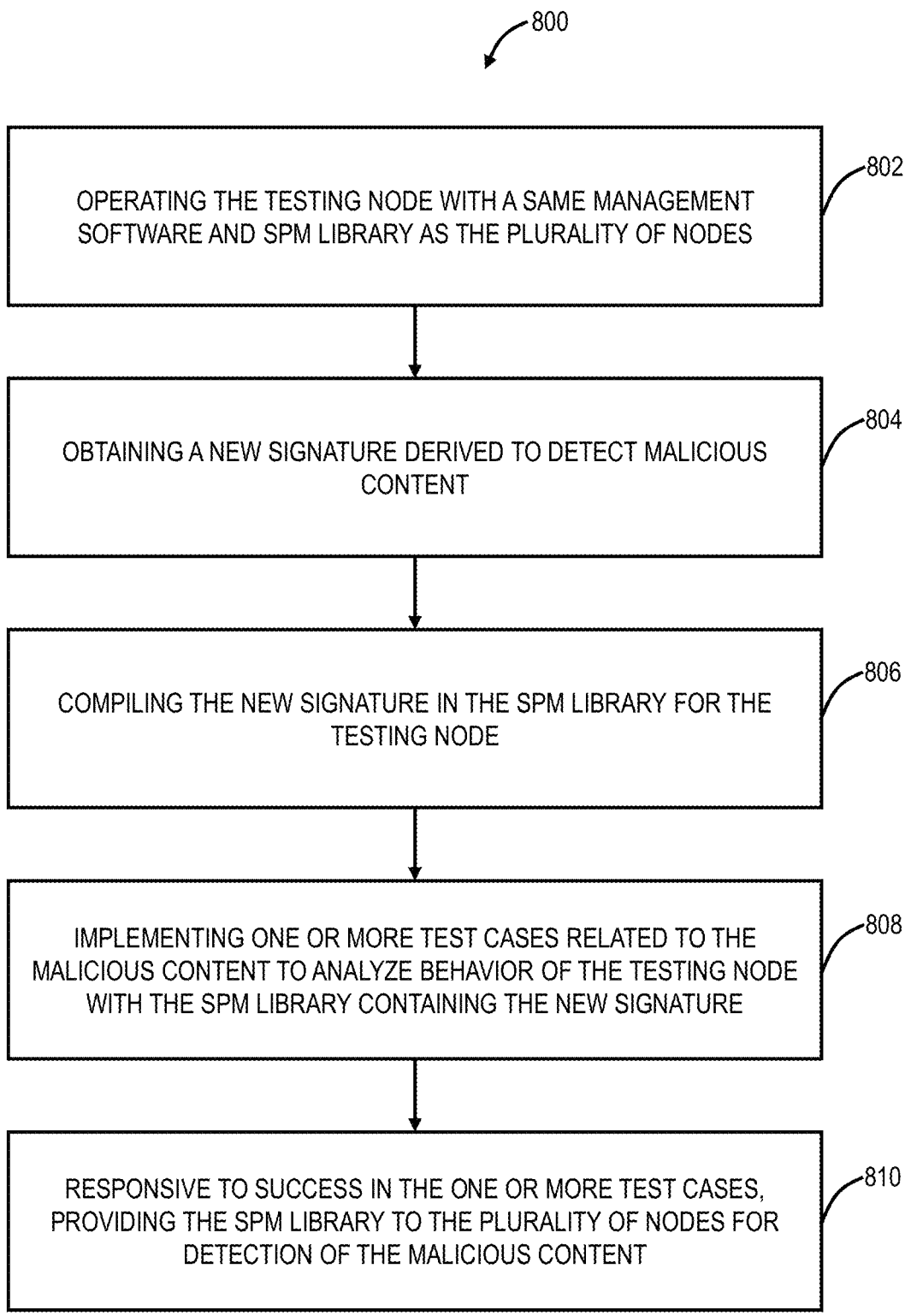
FIG. 11 is a flowchart of a method of testing Signature Pattern Matching (SPM) for a new signature associated with a cloud-based security system with a plurality of nodes and a testing node.

FIG. 11 is a flowchart of a method 800 of testing Signature Pattern Matching (SPM) for a new signature associated with a cloud-based security system with a plurality of nodes and a testing node. The method 800 includes operating the testing node with a same management software and SPM library as the plurality of nodes (step 802); obtaining a new signature derived to detect malicious content (step 804); compiling the new signature in the SPM library for the testing node (step 806); implementing one or more test cases related to the malicious content to analyze behavior of the testing node with the SPM library containing the new signature (step 808); and, responsive to success in the one or more test cases, providing the SPM library to the plurality of nodes for detection of the malicious content (step 810).

As described herein, the testing node is a fully functioning node in the cloud-based security system 100, e.g., a processing node 110, with all of the same functionality, software (e.g., same release/version numbers), etc. To that end, the testing node can participate in any functionality of the cloud-based security system 100. The method 800 can further include providing data to a log associated with the cloud-based security system based on the one or more test cases. The method 800 can also further include updating and managing the testing node in a similar manner as the plurality of nodes. The method 800 can also further include synchronizing the testing node with the plurality of nodes using Network Time Protocol (NTP) such that logs match in the cloud-based security system.

In an embodiment, the testing node is a live node in the cloud-based security system which monitors customer traffic in addition to the one or more test cases. In another embodiment, the testing node is a test node in the cloud-based security system which monitors simulated, historical, and/or redirected customer traffic in addition to the one or more test cases. In either case, the testing node functionally is identical to the processing nodes 110 providing a test bed for new signatures that shows actual behavior as opposed to simulated, laboratory behavior.

As described herein, one advantage of the cloud-based security system 100 is instant visibility to a vast number of users worldwide. Thus, new exploits (zero-day, zero-hour) can be quickly detected by the cloud-based security system 100, such as using behavioral analysis including sandboxing of new, unknown content. Once the new, unknown content is determined to be malicious content, a signature is determined which is a fingerprint of the malicious content. Once a signature is determined and tested effective, the cloud-based security system 100 can propagate the SPM library with the new signature to all of the processing nodes 110, such as via the authority node 120 as described herein, for instant protection worldwide.

§ 7.5 Test Clouds

In an embodiment, multiple processing nodes 110A can be configured in a so-called test cloud. Also, there can be multiple test clouds—ones for different versions of code, different features, etc. Having multiple test clouds enables upgrading one without risking the other test clouds, etc. Also, having multiple test clouds enables segregation of the testing.

The setup of each test cloud is complex. In an embodiment, each test cloud may include the same IP addresses. As such, the multiple test clouds can have their IP addresses abstracted away so that multiple IP addresses can have the same IP addresses. That is, the multiple processing nodes 110A with the same IP address (e.g., 10.0.0.60) can communicate with the API 606 and the other components in the SPM testing system 600 without issue.

Specifically, a different network namespace is used for each test cloud, which are then connected back to a main network namespace that contains the SPM testing system 600. The SPM testing system 600 uses a variable n to uniquely identify each test cloud then communication in the SPM testing system 600 uses port number+n. For example, Network Address Translation (NAT)'s ports 44300+n for the management API, 8000+n for proxy port, 2200+n for SSH and those addresses then map to 10.0.[n]0.2, ports 443, 80, and 22, respectively for cloud number n. On the network namespaces for the testing parts, those addresses are then mapped to the actual (conflicting) IP addresses of the nodes we want to talk to. No network namespace has any idea that the others exist.

It is also necessary to be able to test any URL, which means a special DNS server is needed that will get the processing node 110A to resolve most hostnames correctly, but the hostnames used for test cases should resolve to the testing system instead of what they might really resolve to. The DNS server is part of the testing program.

§ 8.0 Historical Logs

Figure 12:
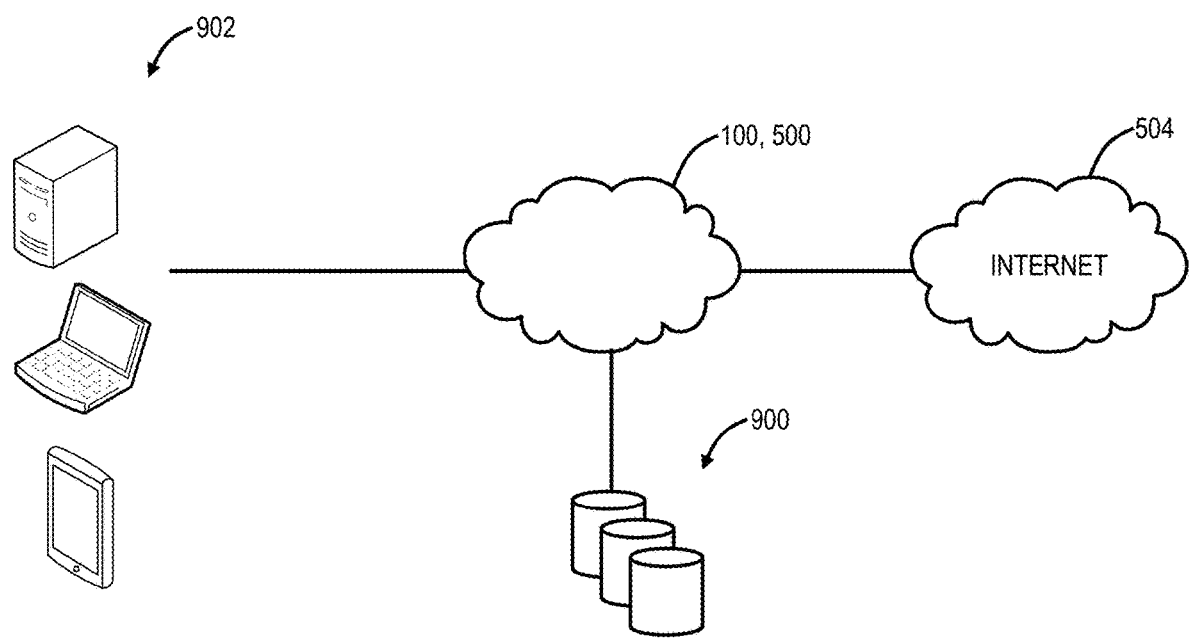
FIG. 12 is a block diagram of a log system connected to or part of a security system such as the cloud-based security system or the cloud system.

FIG. 12 is a block diagram of a log system 900 connected to or part of a security system such as the cloud-based security system 100 or the cloud system 500. The log system 900 can be a database that maintains historical logs of transactions. The log system 900 can be the logging nodes 140 or the like. The log system 900 is configured to maintain log data for each transaction of users 902 (e.g., the external system 200, the computer device 220, the mobile device 230, the regional office 510, the headquarters 520, the employee's homes 530, the mobile laptop 540, the mobile device 542, and the like).

For example, the log system 900 can be Zscaler's Nanolog available from the Applicant, Zscaler, Inc. Also, data from the Nanolog can be provided to other systems, such as by a Nanolog Streaming Service (NSS), in real time from the a Security Information and Event Management (SIEM) system, such as Splunk or ArcSight, enabling real-time alerting, correlation with the logs of other devices, and long-term local log archival. Additionally, a description of log collection and storage is described in commonly-assigned U.S. Pat. No. 8,429,111, issued Apr. 23, 2013, and entitled "Encoding and compression of statistical data," the contents of which are incorporated by reference herein.

The log system can record various fields for each transaction. The following table includes non-limiting example fields in the log system.

| Field name | Description |
| --- | --- |
| Number | A transaction number |
| Event time | Transaction time |
| Logged time | Time transaction entered into the log |
| User | User identifier |
| URL | URL associated with the transaction |
| Policy action | Action taken by the security system on the transaction |
| Cloud Application Class | Cloud Application Class of the transaction |
| Cloud Application | Cloud Application of the transaction |
| Received Bytes | Received Bytes of the transaction |
| Sent Bytes | Sent Bytes of the transaction |
| Total Bytes | Total Bytes of the transaction |
| Proxy Latency (ms) | Latency of the security system |
| Server Trans. Time (ms) | Server Trans. Time of the transaction |

-continued

| Field name | Description |
| --- | --- |
| Client Trans. Time (ms) | Client Trans. Time of the transaction |
| URL Class | URL Class of the transaction |
| URL Super Category | URL Super Category of the transaction |
| URL Category | URL Category of the transaction |
| Threat Super Category | Threat Super Category of the transaction |
| Threat Category | Threat Category of the transaction |
| MD5 | MD5 hash of the transaction |
| Threat Name | Threat Name of the transaction |
| Suspicious Content | Suspicious Content of the transaction |
| DLP Engine | DLP Engine used in the transaction |
| DLP Dictionaries | DLP Dictionaries used in the transaction |
| Location | User location |
| Department | User department |
| Client IP | Client IP address |
| Client External IP | Client External IP address |
| Server IP | Server IP address |
| Request | Request of the transaction |
| Response | Response of the transaction |
| User Agent | User Agent of the transaction |
| URL Categorization | URL Categorization of the transaction |
| Method | HTTP methods, e.g., GET, POST, PUT, DELETE, PATCH, etc. |
| Referrer URL | Referrer URL of the transaction |
| File Name | File Name of the transaction |
| Throttled response bytes | Throttled response bytes of the transaction |
| Throttled request bytes | Throttled request bytes of the transaction |
| Bandwidth Rule | Bandwidth Rule of the transaction |
| Bandwidth Class | Bandwidth Class of the transaction |
| Traffic Forwarding | Traffic Forwarding of the transaction |
| Protocol Type | Protocol Type of the transaction |
| Rule Name | Rule Name of the transaction |
| Policy Type | Policy Type of the transaction |

Figure 13:
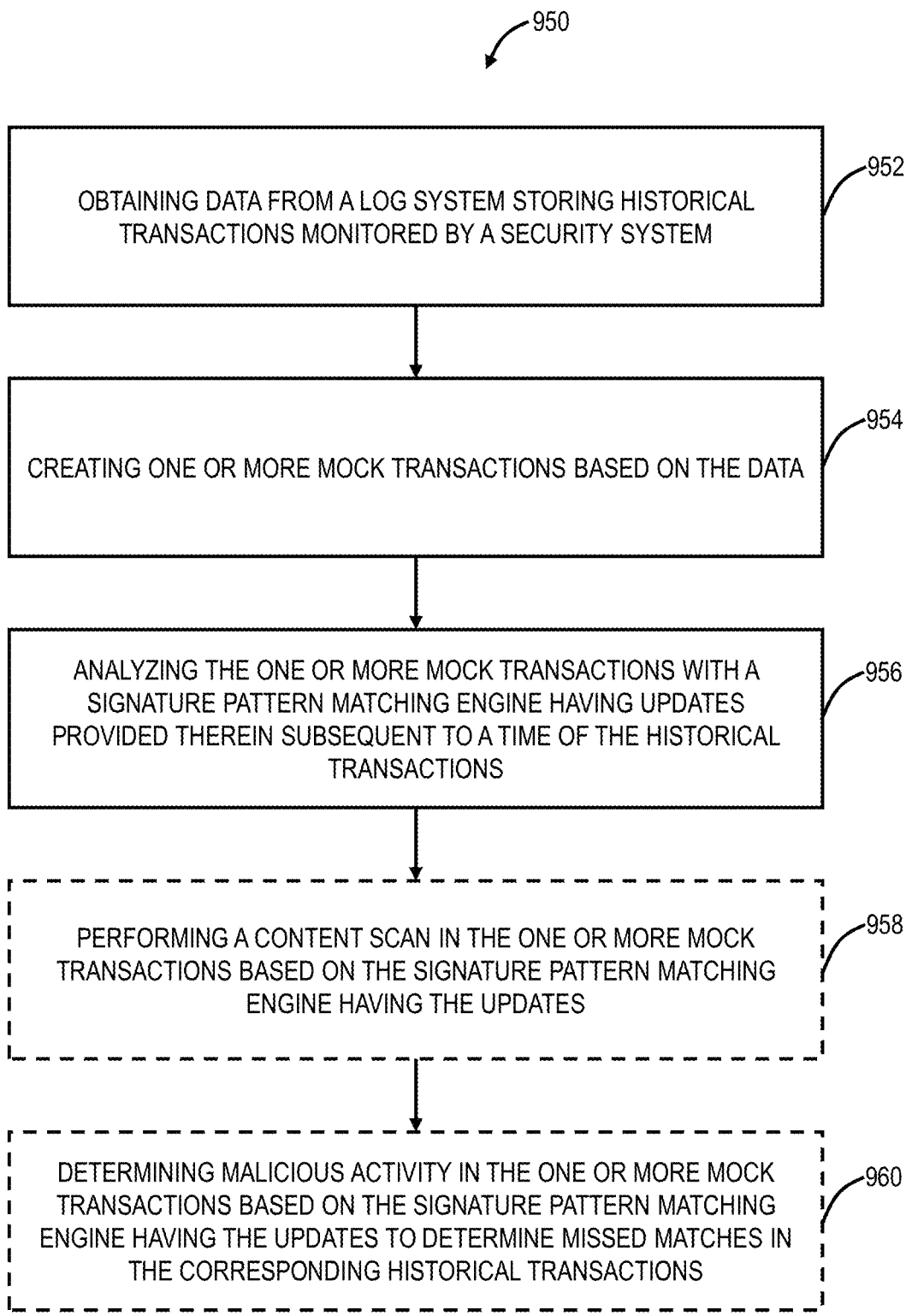
FIG. 13 is a flowchart of a method of historical log analysis.

FIG. 13 is a flowchart of a method 950 of historical log analysis. The method 950 includes obtaining data from a log system storing historical transactions monitored by a security system (step 952); creating one or more mock transactions based on the data (step 954); and analyzing the one or more mock transactions with a signature pattern matching engine having updates provided therein subsequent to a time of the historical transactions (step 956).

The method 950 leverages data in fields in the log system 900, such as HTTP headers and destination information. The objective is to construct a request packet buffer leveraging the fields stored in these log lines. In one embodiment, a packet buffer is created using "Method"+"URL"+"Referrer URL"+"User Agent"+"Dummy data" and then a String Pattern Matching engine is run against this buffer to flag known malicious activities leveraging any of those fields for data exfiltration, command and control activity, or serving malicious payloads. This performs a content based scan after the event has already happened.

In another embodiment, another scan that will happen as part of the method 950 will include reputation based lookup of URL, Hostname, Server IP from each of the uncategorized transactions [MISCELLANEOUS_UNKNOWN] to identify potentially malicious transactions that were missed in the past. The objective is to leverage today's threat intelligence and apply it using above two example embodiments to detect malicious activity that may have occurred in the past.

The one or more mock transactions can have a header based on the data from corresponding historical transactions. A data portion of the one or more transactions can have any of random data and predetermined fixed data with this data being different from data in the corresponding historical transactions. The security system can have analyzed corresponding historical transactions of the one or more mock transactions with the signature pattern matching engine available at a time of the corresponding historical transactions.

The method 950 can further include performing a content scan in the one or more mock transactions based on the signature pattern matching engine having the updates (step 958). The one or more mock transactions can have a header based on the data from corresponding historical transactions, and wherein the header includes fields for one or more of Hypertext Transfer Protocol (HTTP) method, Uniform Resource Locator (URL), referrer URL, and User Agent.

The method 950 can further include determining malicious activity in the one or more mock transactions based on the signature pattern matching engine having the updates to determine missed matches in the corresponding historical transactions (step 960). The one or more mock transactions can have a header based on the data from corresponding historical transactions, and wherein the header includes fields for one or more of Uniform Resource Locator (URL), hostname, and Server Internet Protocol (IP) address.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming a processor to perform the steps of:
   obtaining data from a log system storing historical transactions monitored in real time by a security system;
   creating one or more mock transactions based on the historical transactions, wherein the creating includes constructing a request packet buffer utilizing fields stored in logs of the historical transactions, and wherein the one or more mock transactions have one of a header based on the data from the fields and a data portion that includes any of random data and predetermined fixed data with this data being different from data in the corresponding historical transactions or a header based on the data from corresponding historical transactions, wherein the header of the request packet buffer is created using Hypertext Transfer Protocol (HTTP) method, Uniform Resource Locator (URL), referrer URL, and User Agent; and
   analyzing the one or more mock transactions with a signature pattern matching engine having updates provided therein subsequent to a time of the historical transactions.

2. The non-transitory computer-readable storage medium of claim 1, wherein the security system analyzed corresponding historical transactions of the one or more mock transactions with the signature pattern matching engine available at a time of the corresponding historical transactions.

3. The non-transitory computer-readable storage medium of claim 1, wherein the computer readable code stored further programs the processor to perform the steps of:
   performing a content scan in the one or more mock transactions based on the signature pattern matching engine having the updates.

4. The non-transitory computer-readable storage medium of claim 1, wherein the computer readable code stored further programs the processor to perform the steps of:
   determining malicious activity in the one or more mock transactions based on the signature pattern matching engine having the updates to determine missed matches in the corresponding historical transactions.

5. The non-transitory computer-readable storage medium of claim 3, wherein the header includes fields for one or more of Uniform Resource Locator (URL), hostname, and Server Internet Protocol (IP) address.

6. An apparatus comprising:
   a processor and memory storing instructions that, when executed, cause the processor to
   obtain data from a log system storing historical transactions monitored in real time by a security system;
   create one or more mock transactions based on the historical transactions, wherein the creating includes constructing a request packet buffer utilizing fields stored in logs of the historical transactions, and wherein the one or more mock transactions have one of a header based on the data from the fields and a data portion that includes any of random data and predetermined fixed data with this data being different from data in the corresponding historical transactions or a header based on the data from corresponding historical transactions, wherein the header of the request packet buffer is created using Hypertext Transfer Protocol (HTTP) method, Uniform Resource Locator (URL), referrer URL, and User Agent; and
   analyze the one or more mock transactions with a signature pattern matching engine having updates provided therein subsequent to a time of the historical transactions.

7. The apparatus of claim 6, wherein the security system analyzed corresponding historical transactions of the one or more mock transactions with the signature pattern matching engine available at a time of the corresponding historical transactions.

8. The apparatus of claim 6, wherein the memory storing instructions that, when executed, further cause the processor to
   perform a content scan in the one or more mock transactions based on the signature pattern matching engine having the updates.

9. The apparatus of claim 6, wherein the memory storing instructions that, when executed, further cause the processor to
   determine malicious activity in the one or more mock transactions based on the signature pattern matching engine having the updates to determine missed matches in the corresponding historical transactions.

10. The apparatus of claim 9, wherein the header includes fields for one or more of Uniform Resource Locator (URL), hostname, and Server Internet Protocol (IP) address.

11. A method comprising:
    obtaining data from a log system storing historical transactions monitored in real time by a security system;
    creating one or more mock transactions based on the historical transactions, wherein the creating includes constructing a request packet buffer utilizing fields stored in logs of the historical transactions, and wherein the one or more mock transactions have one of a header based on the data from the fields and a data portion that includes any of random data and predetermined fixed data with this data being different from data in the corresponding historical transactions or a header based on the data from corresponding historical transactions, wherein the header of the request packet buffer is created using Hypertext Transfer Protocol (HTTP) method, Uniform Resource Locator (URL), referrer URL, and User Agent; and
    analyzing the one or more mock transactions with a signature pattern matching engine having updates provided therein subsequent to a time of the historical transactions.

12. The method of claim 11, further comprising:
    performing a content scan in the one or more mock transactions based on the signature pattern matching engine having the updates.

13. The method of claim 11, further comprising:
    determining malicious activity in the one or more mock transactions based on the signature pattern matching engine having the updates to determine missed matches in the corresponding historical transactions.

* * * * *